US012604307B2

(12) United States Patent
Kim et al.

(10) Patent No.: US 12,604,307 B2
(45) Date of Patent: Apr. 14, 2026

(54) METHOD AND APPARATUS FOR TRANSMITTING AND RECEIVING SIGNAL IN COMMUNICATION SYSTEM

(71) Applicant: Electronics and Telecommunications Research Institute, Daejeon (KR)

(72) Inventors: Cheul Soon Kim, Daejeon (KR); Sung Hyun Moon, Daejeon (KR); Jung Hoon Lee, Daejeon (KR); Young-Jo Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 563 days.

(21) Appl. No.: 18/077,121

(22) Filed: Dec. 7, 2022

(65) Prior Publication Data

US 2023/0189253 A1      Jun. 15, 2023

(30) Foreign Application Priority Data

Dec. 9, 2021    (KR) ........................ 10-2021-0175955
Dec. 5, 2022    (KR) ........................ 10-2022-0167443

(51) Int. Cl.
| | |
|---|---|
| *H04W 4/00* | (2018.01) |
| *H04L 5/00* | (2006.01) |
| *H04W 72/044* | (2023.01) |
| *H04W 72/1263* | (2023.01) |
| *H04W 72/20* | (2023.01) |

(52) U.S. Cl.
CPC ....... *H04W 72/1263* (2013.01); *H04L 5/0053* (2013.01); *H04W 72/046* (2013.01); *H04W 72/20* (2023.01)

(58) Field of Classification Search
CPC ........... H04W 72/1263; H04W 72/046; H04W 72/20; H04W 88/04; H04L 5/0053; H04L 5/0007; H04L 5/0023; H04L 5/0055; H04L 5/0091; H04B 7/0617; H04B 7/0639; H04B 7/15528
See application file for complete search history.

(56) References Cited

U.S. PATENT DOCUMENTS

| | | | |
|---|---|---|---|
| 10,728,913 B2 | 7/2020 | Zhang et al. | |
| 10,938,635 B2 | 3/2021 | Islam et al. | |

(Continued)

FOREIGN PATENT DOCUMENTS

| | | | | |
|---|---|---|---|---|
| CN | 104969619 B | * | 1/2020 | ............ H04W 40/22 |
| KR | 20150113662 A | * | 10/2015 | |

(Continued)

*Primary Examiner* — Thai Dinh Hoang

(74) *Attorney, Agent, or Firm* — KILE PARK REED & HOUTTEMAN PLLC

(57) ABSTRACT

A method of an intermediate node for relaying communication between a base station and a terminal may comprise: receiving, from the base station, first control information including on/off indication; and determining whether to relay the communication between the base station and the terminal according to the on/off indication, wherein when the on/off indication indicates 'on', the communication between the base station and the terminal is relayed, and when the on/off indication indicates 'off', the communication between the base station and the terminal is not relayed.

12 Claims, 10 Drawing Sheets

(56)  References Cited

U.S. PATENT DOCUMENTS

| | | | | |
|---|---|---|---|---|
| 12,082,135 | B2 * | 9/2024 | Ali ......................... | H04W 76/10 |
| 2017/0265187 | A1 * | 9/2017 | Chen .................. | H04B 7/15507 |
| 2020/0162208 | A1 | 5/2020 | Moon et al. | |
| 2020/0280971 | A1 | 9/2020 | Moon et al. | |
| 2020/0296680 | A1 * | 9/2020 | Akkarakaran ........ | H04W 4/029 |
| 2021/0044412 | A1 * | 2/2021 | Li ......................... | H04L 5/0092 |
| 2021/0176759 | A1 | 6/2021 | Abedini et al. | |
| 2021/0306065 | A1 | 9/2021 | Abedini et al. | |
| 2021/0385813 | A1 | 12/2021 | Irukulapati et al. | |
| 2022/0046557 | A1 | 2/2022 | Molavianjazi et al. | |
| 2022/0053486 | A1 * | 2/2022 | Abedini .............. | H04B 7/0696 |
| 2023/0189253 | A1 * | 6/2023 | Kim ..................... | H04L 5/0007 |
| | | | | 370/329 |

FOREIGN PATENT DOCUMENTS

| | | | | |
|---|---|---|---|---|
| WO | WO-2018166579 | A1 * | 9/2018 | ............ H04W 24/02 |
| WO | WO-2022271071 | A1 * | 12/2022 | |

* cited by examiner

100

200

220 memory

ROM | RAM

210 processor input interface device ~240 output interface device ~250

270 storage device ~260 transceiver ~230 base station intermediate node

RRC ◄ - - - - - ► RRC

PDCP/RLC/ MAC/PHY ◄ - - - - - ► PDCP/RLC/ MAC/PHY

METHOD AND APPARATUS FOR TRANSMITTING AND RECEIVING SIGNAL IN COMMUNICATION SYSTEM

CROSS-REFERENCE TO RELATED APPLICATIONS

This application claims priority to Korean Patent Applications No. 10-2021-0175955, filed on Dec. 9, 2021 and No. 10-2022-0167443, filed on Dec. 5, 2022 with the Korean Intellectual Property Office (KIPO), the entire contents of which are hereby incorporated by reference.

BACKGROUND

1. Technical Field

Exemplary embodiments of the present disclosure relate to a communication technique, and more particularly, to a technique for transmitting and receiving signals in an intermediate node.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like. Discussion on a sixth generation (6G) communication system after the 5G communication system is in progress.

Meanwhile, an intermediate node for relaying communication between a base station and a terminal may be introduced into the communication system. The intermediate node may receive a signal from the base station and transmit the signal to the terminal. In addition, the intermediate node may receive a signal from the terminal and transmit the signal to the base station. Depending on a situation of the communication system, the relaying operation of the intermediate node may not be required. In this case, methods for controlling the operation of the intermediate node are needed.

SUMMARY

Exemplary embodiments of the present are directed to providing a method and an apparatus for transmitting and receiving signals in an intermediate node.

According to a first exemplary embodiment of the present disclosure, a method of an intermediate node for relaying communication between a base station and a terminal may comprise: receiving, from the base station, first control information including on/off indication; and determining whether to relay the communication between the base station and the terminal according to the on/off indication, wherein when the on/off indication indicates 'on', the communication between the base station and the terminal is relayed, and when the on/off indication indicates 'off', the communication between the base station and the terminal is not relayed.

The method may further comprise: relaying the communication between the base station and the terminal when the on/off indicates 'on', wherein the relaying of the communication may comprise: transmitting a first signal received from the base station to the terminal; transmitting a second signal generated by the intermediate node to the terminal; transmitting a third signal obtained by multiplexing the first signal and the second signal to the terminal; transmitting a fourth signal received from the terminal to the base station; transmitting a fifth signal generated by the intermediate node to the base station; or transmitting a sixth signal obtained by multiplexing the fourth signal and the fifth signal to the base station.

The on/off indication may be classified into a downlink (DL) on/off indication and an uplink (UL) on/off indication; when the DL on/off indication indicates 'DL on', the intermediate node performs DL communication for the terminal; when the DL on/off indication indicates 'DL off', the intermediate node does not perform DL communication for the terminal; when the UL on/off indication indicates 'UL on', the intermediate node perform UL communication for the base station; and when the UL on/off indication indicates 'UL off', the intermediate node does not perform UL communication for the base station.

The first control information may further include information on a beam of the intermediate node, which is used to relay the communication between the base station and the terminal.

A DL reception beam and a DL transmission beam of the intermediate node may be independently controlled by the base station.

The method may further comprise: receiving second control information from the base station, wherein when the first control information and the second control information are received in a same time period, the first control information and the second control information may include same information element, and the same information element may be at least one of the on/off indication or beam information.

The method may further comprise: transmitting acknowledgment (ACK) for the first control information to the base station.

A subcarrier spacing (SCS) of the intermediate node may be greater than or equal to an SCS of the terminal.

The first control information may be reflected at the intermediate node after an application time elapses.

According to a second exemplary embodiment of the present disclosure, a method of a base station may comprise: transmitting, to an intermediate node relaying communication between the base station and a terminal, first control information including on/off indication; and performing communication with the terminal according to the on/off indication, wherein when the on/off indication indicates 'on', the communication between the base station and the terminal is relayed by the intermediate node, and when the on/off indication indicates 'off', the communication between the base station and the terminal is performed without relaying of the intermediate node.

The first control information may further include information on a beam of the intermediate node, which is used to relay the communication between the base station and the terminal.

A downlink (DL) reception beam and a DL transmission beam of the intermediate node may be independently controlled by the base station.

The method may further comprise: transmitting second control information to the intermediate node, wherein when the first control information and the second control information are transmitted in a same time period, the first control information and the second control information include same information element, and the same information element is at least one of the on/off indication or beam information.

The method may further comprise: receiving acknowledgment (ACK) for the first control information from the terminal.

According to a third exemplary embodiment of the present disclosure, an intermediate node for relaying communication between a base station and a terminal may comprise a processor, wherein the processor causes the intermediate node to perform: receiving, from the base station, first control information including on/off indication; and determining whether to relay the communication between the base station and the terminal according to the on/off indication, wherein when the on/off indication indicates 'on', the communication between the base station and the terminal is relayed, and when the on/off indication indicates 'off', the communication between the base station and the terminal is not relayed.

The processor may cause the intermediate node to perform: relaying the communication between the base station and the terminal when the on/off indicates 'on', wherein the relaying of the communication may comprise: transmitting a first signal received from the base station to the terminal; transmitting a second signal generated by the intermediate node to the terminal; transmitting a third signal obtained by multiplexing the first signal and the second signal to the terminal; transmitting a fourth signal received from the terminal to the base station; transmitting a fifth signal generated by the intermediate node to the base station; or transmitting a sixth signal obtained by multiplexing the fourth signal and the fifth signal to the base station.

The on/off indication may be classified into a downlink (DL) on/off indication and an uplink (UL) on/off indication; when the DL on/off indication indicates 'DL on', the intermediate node performs DL communication for the terminal; when the DL on/off indication indicates 'DL off', the intermediate node does not perform DL communication for the terminal; when the UL on/off indication indicates 'UL on', the intermediate node perform UL communication for the base station; and when the UL on/off indication indicates 'UL off', the intermediate node does not perform UL communication for the base station.

The first control information may further include information on a beam of the intermediate node, which is used to relay the communication between the base station and the terminal.

The processor may cause the intermediate node to perform: receiving second control information from the base station, wherein when the first control information and the second control information are received in a same time period, the first control information and the second control information may include same information element, and the same information element may be at least one of the on/off indication or beam information.

The processor may cause the intermediate node to perform: transmitting acknowledgment (ACK) for the first control information to the base station.

According to the present disclosure, a base station can control operations of an intermediate node by transmitting on/off indication to the intermediate node. When the on/off indication indicates 'on', the intermediate node may relay communication between the base station and a terminal. When the on/off indication indicates 'off', the intermediate node may not relay communication between the base station and the terminal. That is, the operation of the intermediate node may be turned on or off according to a situation of the communication system. Accordingly, the communication can be efficiently performed in the communication system including the intermediate node.

BRIEF DESCRIPTION OF DRAWINGS

FIG. 11 is a conceptual diagram illustrating a common pattern and a UE-specific pattern in a TDD scenario.

DETAILED DESCRIPTION OF THE EMBODIMENTS

Figure 1:
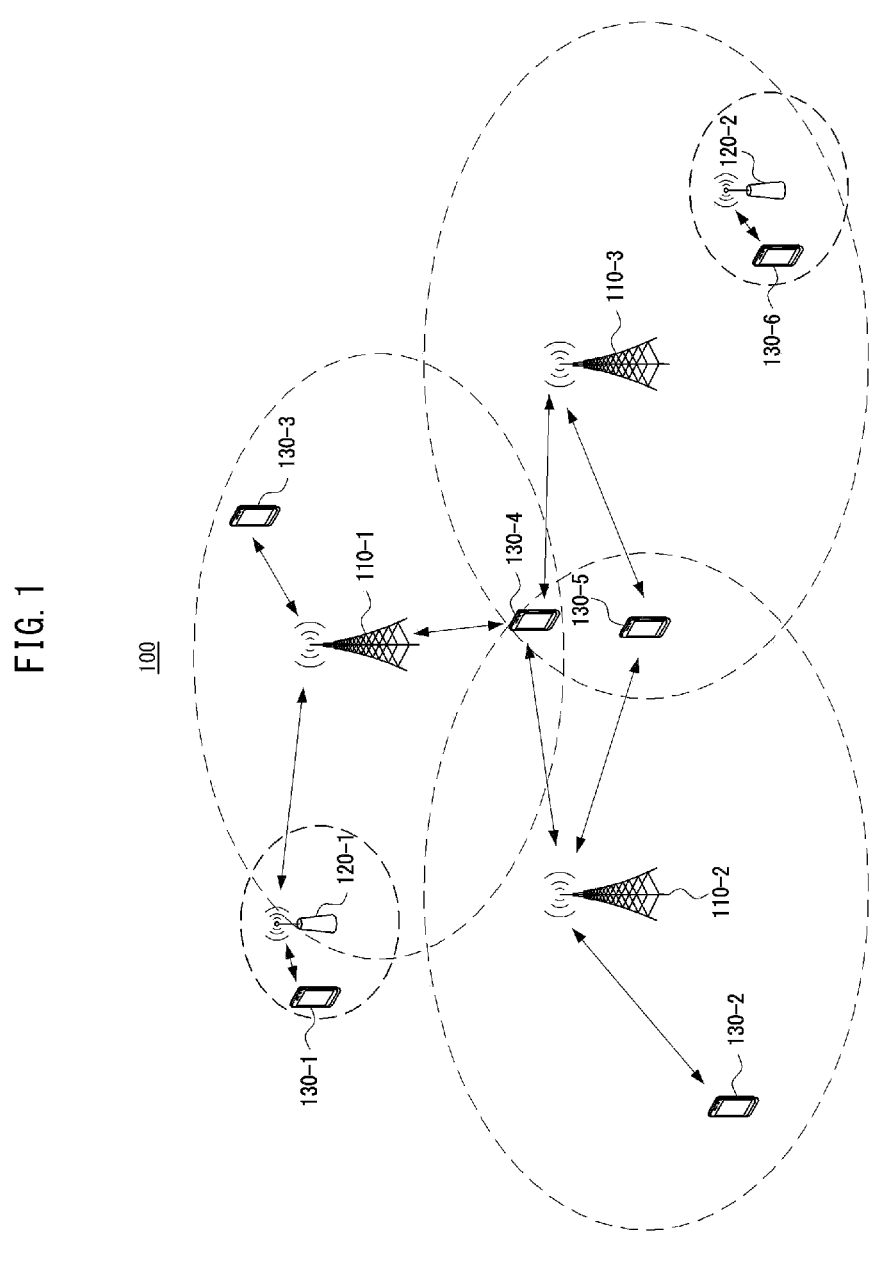
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. The signaling may be at least one of system information (SI) signaling (e.g., transmission of system information block (SIB) and/or master information block (MIB)), RRC signaling (e.g., transmission of RRC message(s), RRC parameter(s) and/or higher layer parameter(s)), MAC control element (CE) signaling (e.g., transmission of a MAC message and/or MAC CE), PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figures 2, 3:
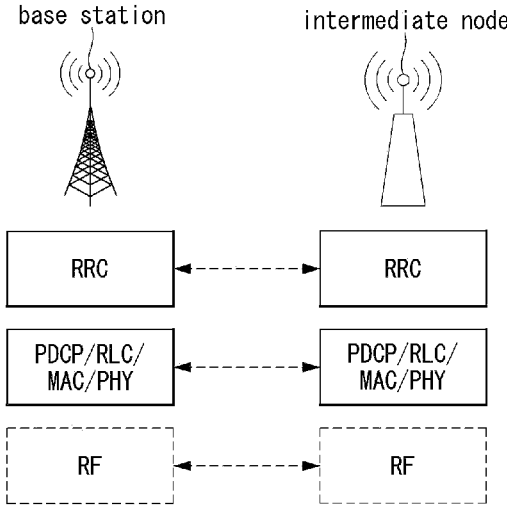
FIG. 2 is a block diagram illustrating a first exemplary embodiment of a communication node constituting a communication system.
FIG. 3 is a conceptual diagram illustrating a first exemplary embodiment of a control plane of an intermediate node.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

In order to reduce an error rate of data, a low modulation and coding scheme (MCS) level (or, low MCS index) may be applied. In order not to increase a size of a field indicated by downlink control information (DCI), frequently used MCS(s) may be selected. In order to apply a lower MCS, a repeated transmission operation may be supported. In case of applying a quadrature phase shift keying (QPSK) which is the lowest modulation rate, an effect of further reducing the code rate may occur. In particular, since a transmit power is limited in uplink (UL) transmission, the repeated transmission operation may be performed in the time domain rather than in the frequency domain.

In the case of eMBB traffic and URLLC traffic, a lower MCS may be used for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, the eMBB traffic may be repeatedly transmitted even when a relatively large latency occurs. The URLLC traffic may be transmitted using new MCSs (e.g., low MCS) rather than the repeated transmission. The new MCS may be configured by an RRC message and/or a DCI.

In order to support repeated transmissions for the eMBB traffic in the time domain, a physical uplink shared channel (PUSCH) repetition (e.g., PUSCH repetition type A) may be introduced. In this case, a PUSCH allocated on a slot basis may be repeatedly transmitted. To extend a coverage, a time resource may be allocated over a plurality of slots. When the PUSCH repetition type A is used, the time resource may be configured by an RRC message and/or a DCI. The number of repetitions of the PUSCH may be indicated by the RRC message, and a time resource for transmitting the PUSCH in the first slot may be indicated by the DCI (e.g., in case of type 2 configured grant (CG) or dynamic grant) or the RRC message (e.g., in case of type 1 CG).

In order to support URLLC traffic, it may be preferable for the terminal to perform frequent reception operations in downlink (DL) resources and/or frequent transmission operations in uplink (UL) resources. In a time division duplex (TDD) system, the terminal may operate based on a half-duplex scheme. Accordingly, a time of supporting DL traffic and/or UL traffic may increase according to a slot pattern. On the other hand, in a frequency division duplex (FDD) system, the terminal may utilize DL resources and UL resources at the same time. Accordingly, the above-described problem in the TDD system may not occur in the FDD system. The FDD system may use two or more carriers. When two or more serving cells are configured to the terminal in the TDD system, the terminal may utilize DL resources and UL resources.

Carrier aggregation (CA) may be configured in the terminal, and a PCell and SCell(s) may be activated. Depending on whether a common search space (CSS) set is included, a cell may be classified into a PCell or an SCell. For example, the PCell may include a CSS set, and the SCell may not include a CSS set. In order to reduce a latency in a communication system supporting URLLC traffic, slots having different patterns may be configured and/or indicated to the terminal.

A small cell or an integrated access and backhaul (IAB) node may be deployed to widen a coverage. A throughput of the small cell or IAB may vary depending on a quality of a backhaul. It may be costly to secure the backhaul. In order to solve this problem, a relay device may be deployed in the communication system and may forward high-quality signals to the terminal. The relay device may be classified into several types depending on a signal forwarding scheme. A relay device supporting many functions may provide performance similar to that of a base station. Deployment of relay devices supporting fewer functions may be possible at low cost. In the present disclosure, a relay device may support a function of forming beams for terminals and may support a minimum function for forwarding data to the terminals. The base station may transmit a signal to control the relay device. For example, the base station may transmit configuration information (e.g., parameters or control information) to the relay device. The relay device may receive the signal (e.g., configuration information, parameters, and control information) from the base station. In the present disclosure, the relay device may be referred to as a relay terminal, a relay node, a relay, or an intermediate node.

1. Model of Intermediate Node

The intermediate node may receive a signal from the base station and transmit the signal to the terminal. The intermediate node may receive a signal of the terminal and transmit the signal to the base station. The intermediate node may relay communication between the base station and the terminal. In the present disclosure, a signal may include a signal and/or channel. In the transmission operation described above, the intermediate node may amplify the signal. In addition, the intermediate node may perform an additional beamforming function.

The base station may transmit a signal to control the intermediate node. The intermediate node may receive the signal from the base station and may perform operations related to a control plane and/or data plane to recognize or interpret the signal. For example, radio resource control (RRC) signaling may be transmitted and received between the intermediate node and the base station. A data channel may be transmitted and received between the intermediate node and the base station according to dynamic scheduling. A radio link through which transmission and reception between the intermediate node and the base station are performed may be referred to as a control link (i.e., C-link). Since the intermediate node operates as a type of terminal controlled by the base station through the control link, it may be referred to as 'network controlled repeater-mobile termination (NCR-MT)'.

FIG. 3 is a conceptual diagram illustrating a first exemplary embodiment of a control plane of an intermediate node.

Referring to FIG. 3, the intermediate node may include an RRC layer, a packet data convergence protocol (PDCP) layer, a radio link control (RLC) layer, a medium access control (MAC) layer, and a physical (PHY) layer.

Figure 4:
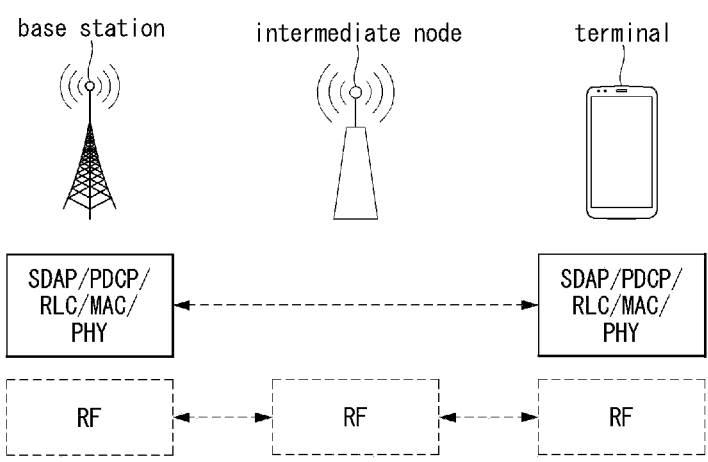
FIG. 4 is a conceptual diagram illustrating a first exemplary embodiment of a data plane of an intermediate node.

FIG. 4 is a conceptual diagram illustrating a first exemplary embodiment of a data plane of an intermediate node.

Referring to FIG. 4, the intermediate node may relay transmission of a data channel between the base station and the terminal using a radio frequency (RF) layer. The relaying function of the intermediate node may be referred to as 'network controlled repeater-forwarding (NCR-Fwd)'.

Figure 5:
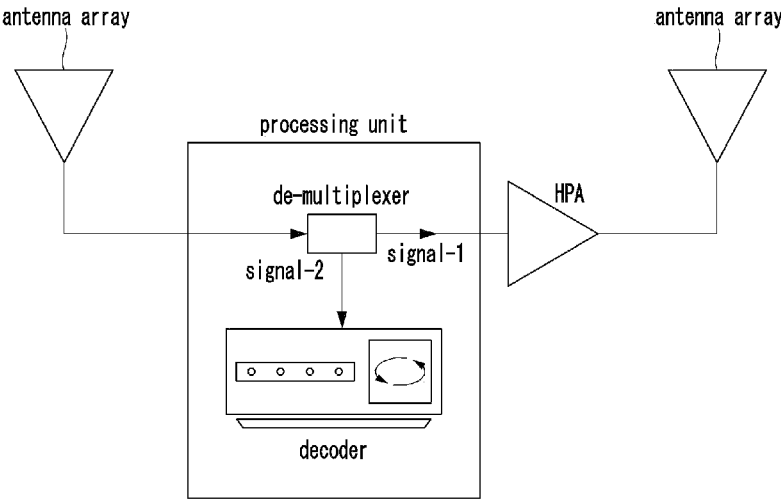
FIG. 5 is a block diagram illustrating a first exemplary embodiment of an intermediate node.

FIG. 5 is a block diagram illustrating a first exemplary embodiment of an intermediate node.

Referring to FIG. 5, the intermediate node may receive a signal from the base station and amplify the signal. The operation of amplifying the signal may be performed by a high power amplifier (HPA) included in the intermediate node. In addition, the intermediate node may decode data by performing a decoding operation on the signal received from the base station. In this case, the signal received from the base station may be branched inside the intermediate node. For example, the received signal may be branched into a signal 1 (i.e., signal-1) and a signal 2 (i.e., signal-2). The signal 1 may mean a 'branched signal 1', and the signal 2 may mean a 'branched signal 2'. A signal strength of each of the signal 1 and the signal 2 may be less than that of the previous signal (e.g., received signal).

The branched signal 1 may be delivered to the amplifier (i.e., HPA) of the intermediate node. The branched signal 2 may be delivered to a reception unit of the intermediate node (e.g., reception unit including a decoder). The operation of branching the signal may be performed in a passband or an intermediate (IF) band. The branched signal 2 may be processed in a base-band, and the processed signal may be delivered to the decoder. The intermediate node may obtain a result of the decoder (e.g., a control message of the base station).

The message of the base station (e.g., data channel and/or control channel) may be received at the intermediate node. For example, the intermediate node may decode a physical downlink shared channel (PDSCH) received from the base station to identify an RRC message or a MAC message. The intermediate node may decode a physical downlink control channel (PDCCH) received from the base station to identify a downlink control information (DCI) message.

Figure 6:
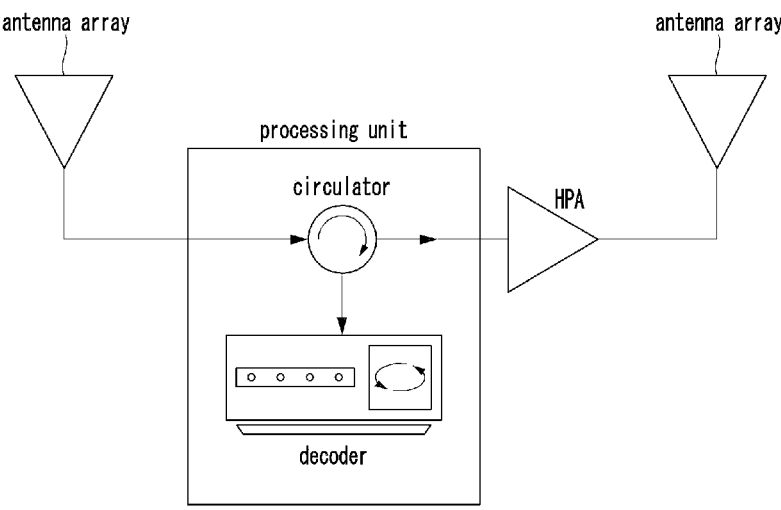
FIG. 6 is a block diagram illustrating a second exemplary embodiment of an intermediate node.

FIG. 6 is a block diagram illustrating a second exemplary embodiment of an intermediate node.

Referring to FIG. 6, the intermediate node may receive a signal from the base station and may perform either an amplification operation or a decoding operation on the signal. That is, the intermediate node may perform one operation at a specific time. In this case, the signal received at the intermediate node may be delivered to the decoder or the amplifier (e.g., HPA). Since the intermediate node performs only one operation at a specific time, both a link between the base station and the intermediate node and a link between the intermediate node and the terminal may not be activated.

The radio link between the intermediate node and the terminal may be connected (e.g., activated) only at a specific time, and the radio link between the intermediate node and the terminal may not be connected at times other than the specific time. The base station may allocate a signal and/or channel (e.g., synchronization signal block (SSB), PDCCH, PDSCH, etc.) to be received by the intermediate node. The aforementioned signal and/or channel may not need to be received by the terminal. The intermediate node and the terminal may not be able to simultaneously receive the signal and/or channel from the base station.

The intermediate node may receive a signal from the terminal and transmit the signal to the base station. The intermediate node may generate a signal and transmit the signal to the base station or the terminal.

Figure 7:
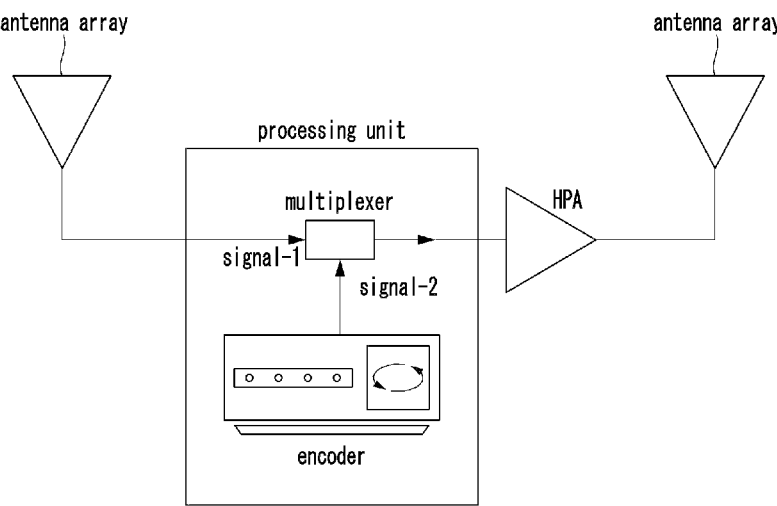
FIG. 7 is a block diagram illustrating a third exemplary embodiment of an intermediate node.

FIG. 7 is a block diagram illustrating a third exemplary embodiment of an intermediate node.

Referring to FIG. 7, the intermediate node may receive a signal 1 from the terminal. The intermediate node may generate a signal 2. The intermediate node may transmit the signal 1 and the signal 2 simultaneously. That is, the intermediate node may transmit the signal 1 and the signal 2 by multiplexing them. The signal 1 and the signal 2 may be orthogonal. A radio resource of the signal 1 and a radio resource of the signal 2 may overlap (e.g., partially overlap). The multiplexing operation of the signal 1 and the signal 2 may be performed in the pass band or IF band. For the multiplexing operation of the signal 1 and the signal 2, detailed implementation of the intermediate node may vary.

Figure 8:
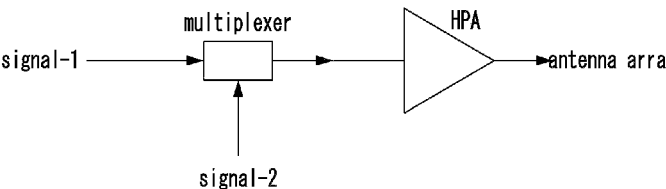
FIG. 8 is a conceptual diagram illustrating a first exemplary embodiment of a signal processing method in an intermediate node.

FIG. 8 is a conceptual diagram illustrating a first exemplary embodiment of a signal processing method in an intermediate node.

Referring to FIG. 8, the intermediate node may generate a multiplexed signal by multiplexing the signal 1 and the signal 2, and may amplify the multiplexed signal in common. A strength $P_1$ of the signal 1 and a strength $P_2$ of the signal 2 may be determined as transmission powers scheduled by the base station. For example, the strength $P_2$ of the signal 2 may be derived from the strength $P_1$ of the signal 1 and a strength $P_R$ of a signal transmitted by the intermediate node. The signal strength may be derived as an average power of OFDM symbol(s).

The intermediate node may estimate the strength $P_1$ of the signal 1 and derive the strength $P_2$ of the signal 2 by instantaneously reflecting $P_1$. For example, the transmission power of the intermediate node may be fixed to $P_R$. Alternatively, considering an amplification gain a of the intermediate node, $P_2$ may be determined such that the following equation is established.

$$P_R = \alpha \cdot (P_1 + P_2) \qquad \text{[Equation 1]}$$

The amplification gain a may be variable. Alternatively, the amplification gain a may be a fixed value. A predetermined processing time may be required to determine $P_2$.

Figure 9:
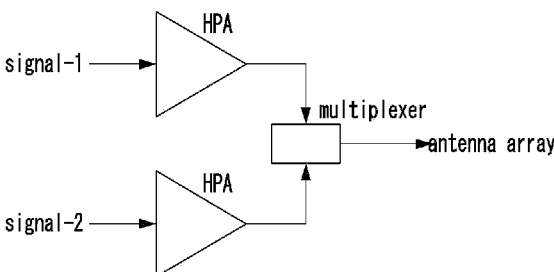
FIG. 9 is a conceptual diagram illustrating a second exemplary embodiment of a signal processing method at an intermediate node.

FIG. 9 is a conceptual diagram illustrating a second exemplary embodiment of a signal processing method at an intermediate node.

Referring to FIG. 9, the intermediate node may amplify each of the signal land the signal 2 through the amplifier (HPA), and multiplex the amplified signal 1 and the amplified signal 2 to generate a multiplexed signal. A relationship between a strength $P_1$ of the signal 1, a strength $P_2$ of the signal 2, a signal strength $P_R$ of the intermediate node, and an amplification gains $\alpha_1$ and $\alpha_2$ of the amplifier may be as shown in Equation 2 below. The amplification gains $\alpha_1$ and $\alpha_2$ may be variable. Alternatively, the amplification gains $\alpha_1$ and $\alpha_2$ may be fixed values.

$$P_R = \alpha_1 \cdot P_1 + \alpha_2 \cdot P_2 \qquad \text{[Equation 2]}$$

The intermediate node may estimate the strength $P_1$ of the signal 1 and derive the strength $P_2$ of the signal 2 by instantaneously reflecting $P_1$. A predetermined processing time may be required to determine $P_2$.

Figure 10:
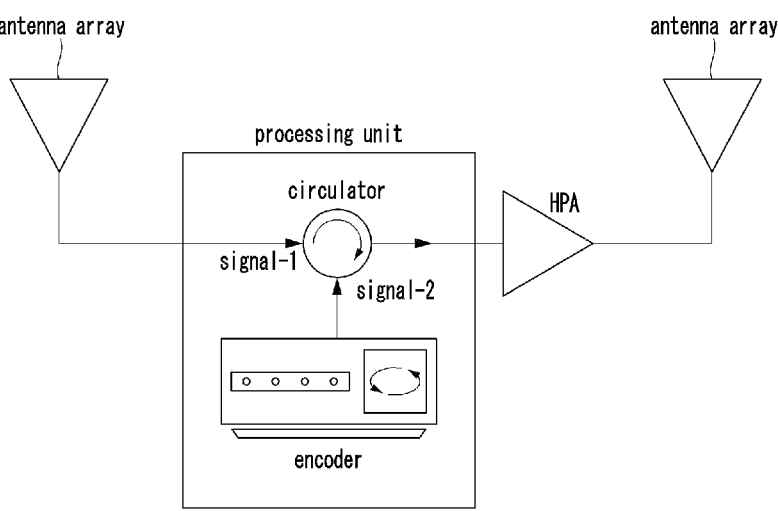
FIG. 10 is a block diagram illustrating a fourth exemplary embodiment of an intermediate node.

FIG. 10 is a block diagram illustrating a fourth exemplary embodiment of an intermediate node.

Referring to FIG. 10, the intermediate node may perform a signal transmission operation or a signal generation operation. That is, the intermediate node may perform one operation at a specific time. To perform both of the operations, the intermediate node needs to be able to multiplex the signal 1 and the signal 2. The multiplexing operation may be performed in the pass band, IF band, or base band. The intermediate node may need to obtain a sum of digital signals or a sum of analog signals for the multiplexing operation. Since significant processing operations are required for this operation, it may be preferable for the intermediate node to perform only one operation.

In the intermediate node, a reception (Rx) antenna array and a transmission (Tx) antenna array may be separated. The reason is that the intermediate node is to suppress self-interference occurring in full-duplex communication. In order to suppress self-interference, an Rx beam and a Tx beam may not be independently determined at the intermediate node, the Rx beam and the Tx beam may be associated with each other, and the Rx beam and the Tx beam may be determined so as to minimize interference therebetween.

When the intermediate node operates in a TDD system, an antenna array of the intermediate node may be used as a Tx antenna array at a first time by a circulator and may be used as an Rx antenna array at a second time by the circulator. In the terminal, a receiving end and a transmitting end may be implemented asymmetrically. For example, the receiving end of the terminal may have 4 antennas, and the transmitting end of the terminal may have 2 antennas. In the intermediate node, the size of the Rx antenna array and the size of the Tx antenna array may be the same. In this case, in a beam management procedure of the intermediate node, alignment or correspondence between the Tx beam and the Rx beam may be simplified.

The link (e.g., radio link) between the intermediate node and the base station may be referred to as a backhaul link, fronthaul link, control link (i.e., C-link), or feeder link. The link (e.g., radio link) between the intermediate node and the terminal may be referred to as an access link or service link.

Beam management in each of the control link, backhaul link, and access link may be performed independently. The base station and/or intermediate node may be involved in the beam management of the backhaul link. The base station and/or the intermediate node may manage a beam of the backhaul link according to technical specifications. The intermediate node and/or terminal may be involved in beam management of the access link. The terminal may manage a beam of the access link according to technical specifications regardless of the existence of the intermediate node. For the beam management procedure of the access link, it may be preferable that the beams of the control link and the backhaul link are reliably managed.

2. TDD Configuration

A TDD scenario may be considered. A TDD slot pattern may be classified into a common pattern and a terminal (UE)-specific pattern. The base station may transmit system information including information on a common pattern to the terminal. Alternatively, in an RRC connection procedure between the base station and the terminal, the base station may transmit an RRC message including information on the common pattern to the terminal. The terminal may obtain the information on the common pattern from the base station. The common pattern may be interpreted as a slot pattern commonly applied to a plurality of terminals.

Thereafter, the base station may configure a UE-specific pattern to the terminal through RRC signaling. The UE-specific pattern may be an independent slot pattern for each terminal. The terminal may obtain information on the UE-specific pattern from the base station. When the UE-specific pattern is configured to the terminal, the terminal may interpret a slot pattern by applying the UE-specific pattern. Some of flexible (FL) symbols configured to the terminal may be dynamically configured as downlink (DL) symbols or uplink (UL) symbols. The terminal may receive a DL signal and/or a DL channel using DL symbols. The terminal may receive a UL signal and/or a UL channel using UL symbols. The terminal may receive DCI indicating a slot format. Based on information included in the DCI, the terminal may regard a portion of FL symbols as DL symbols and may regard another portion of the FL symbols as UL symbols.

For one FL symbol, a first terminal may regard the corresponding FL symbol as a DL symbol, a second terminal may regard the corresponding FL symbol as a UL symbol, and a third terminal may regard the corresponding FL symbol as an FL symbol.

Figure 11:
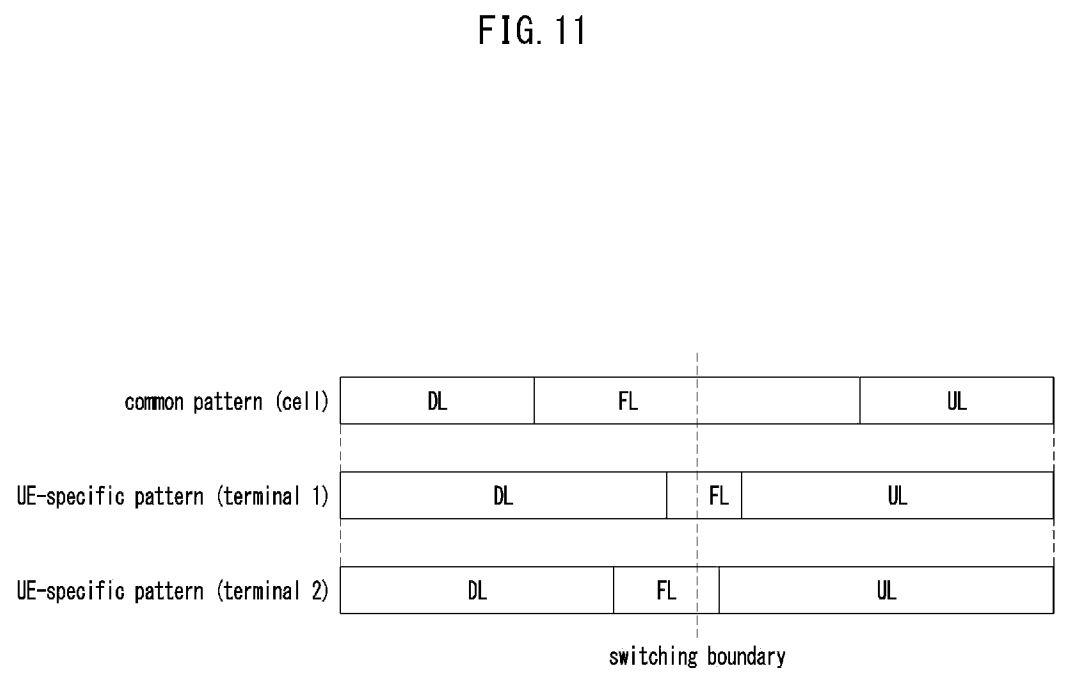

FIG. 11 is a conceptual diagram illustrating a common pattern and a UE-specific pattern in a TDD scenario.

Referring to FIG. 11, 'DL' may mean DL symbol(s) or a DL period, 'UL' may mean UL symbol(s) or a UL period, and 'FL' may mean FL symbol(s) or an FL period. The FL symbol regarded by the first terminal may be different from the FL symbol regarded by the second terminal. Depending on a specific DCI format received from the base station, a DL-UL switching boundary for the first terminal may be different from a DL-UL switching boundary for the second terminal.

The intermediate node may need to perform switching between DL and UL based on one of the switching boundary of the first terminal and the switching boundary of the second terminal. The intermediate node may not perform a switching operation between DL and UL. In this case, assuming that separate antenna arrays are configured for DL and UL to support full-duplex operation, the antenna array may be directed in an unnecessary direction. Therefore, considering performance and efficiency, it may be preferable for the intermediate node to perform the switching operation between DL and UL.

The base station may indicate or configure a TDD DL-UL change boundary (e.g., switching boundary) to the intermediate node using RRC signaling, DCI, and/or repeater control information (RCI). The RCI may mean control information for the intermediate node. Each of DCI and RCI may mean control information. The intermediate node may obtain information of the TDD DL-UL switching boundary from the base station. The base station may configure a serving cell for communication between the intermediate node and the base station to the intermediate node, and may indicate an active bandwidth part (BWP) to the intermediate node using DCI and/or RCI. The intermediate node may obtain information on the serving cell and/or active BWP from the base station.

The TDD DL-UL switching boundary derived by the intermediate node may be given as one timing. The one timing may be at a boundary between two OFDM symbols or in the middle of one OFDM symbol in the active BWP of the intermediate node. The timing may be indicated to the intermediate node based on method(s) below. The TDD DL-UL switching boundary may be referred to as a DL-UL boundary.

As one method for indicating the timing (i.e., DL-UL boundary), the DL-UL boundary may depend only on RRC signaling. In the RRC connection procedure, a reference numerology (e.g., cyclic prefix (CP) length and subcarrier spacing (SCS)) may be configured to the intermediate node. The base station may transmit information on the reference numerology to the intermediate node using RRC signaling. The intermediate node may obtain the information on the reference numerology from the base station. The intermediate node may derive the DL-UL boundary using the information on the reference numerology. A reference SCS may be classified into a reference DL SCS and a reference UL SCS. The reference DL SCS and the reference UL SCS may be independently configured to the intermediate node.

Method 2-1: The intermediate node may derive the DL-UL boundary using the reference SCS.

As another method for indicating the timing (i.e., DL-UL boundary), the DL-UL boundary may be derived based on RCI (e.g., RCI format). The intermediate node may receive an RCI format from which information on the DL-UL boundary and other information are derived. In this case, the intermediate node may apply an SCS of the active BWP. In the present disclosure, 'RCI' and 'RCI format' may be used in the same meaning.

Method 2-2: The intermediate node may derive the DL-UL boundary using the SCS of the active BWP.

The SCS applied to DL-UL switching may be limited. When an SCS of the terminal is narrow (e.g., 15 kHz) and an SCS of the intermediate node is wide (e.g., 30 kHz), the boundary at which UL-DL switching occurs may be different from a symbol boundary of the terminal. The base station may perform scheduling so that the above situation does not occur. Alternatively, the base station may configure a narrow SCS (e.g., SCS for deriving the DL-UL boundary) to the intermediate node so that the above situation does not occur. That is, the SCS for deriving the DL-UL boundary may not be wider than the SCS of the terminal connected to the intermediate node.

Method 2-3: The SCS $\Delta f_r$ applied to DL-UL switching at the intermediate node may be less than or equal to the SCS $\Delta f_y$ applied to the terminal(s) (i.e., $\Delta f_r \leq \Delta f_u$).

For another example, the DL-UL boundary of the intermediate node needs to be precisely expressed. This is because not only the DL-UL boundary of the intermediate node but also a DL-UL boundary of a neighboring base station may be considered. In order to flexibly apply a TDD pattern (e.g., TDD UL-DL pattern) according to a traffic ratio, the SCS applied to DL-UL switching by the intermediate node may be configure to a large value.

Method 2-4: The SCS $\Delta f_r$ applied to DL-UL switching at the intermediate node may be greater than or equal to the SCS $\Delta f_y$ applied to the terminal(s) (i.e., $\Delta f_r \geq \Delta f_u$).

For example, the SCS applied by the intermediate node to DL-UL switching may be different from the SCS applied to the active BWP or TDD related slot pattern.

3. On/Off Signaling

If no scheduling is allocated to the terminal communicating with the base station through the intermediate node, the intermediate node may amplify only noise and forward the amplified noise to the terminal. Therefore, when the base station does not need to use the intermediate node, it may be preferable that the intermediate node does not forward any signals. The base station may instruct the intermediate node not to use the amplifier of the intermediate node (e.g., amplifier used for forwarding of signals and/or channels) depending on whether scheduling is allocated. The above-mentioned indication (hereinafter referred to as 'off indication') may mean that an amplification gain of the intermediate node is set to 0 or nearly 0. Alternatively, the above-mentioned 'off' indication may mean that a transmission power of the intermediate node is set to 0 or nearly 0. The 'off' indication may indicate that the intermediate node does not perform a transmission operation. The 'off' indication may mean at least one of an off state of a link, an off state of a transmission operation in a link, an off state of a transmission beam in a link, an off state of a reception operation in a link, or an off state of a reception beam in a link. Here, the link may be the backhaul link, control link, and/or access link. The 'off' indication may not be signaled to the intermediate node.

Alternatively, the base station may instruct the intermediate node to use the amplifier of the intermediate node. The above-mentioned indication may be referred to as an 'on' indication. The 'on' indication may indicate that the intermediate node performs a transmission operation. The 'on' indication may mean at least one of an on state of a link, an on state of a transmission operation in a link, an on state of a transmission beam in a link, an on state of a reception operation in a link, or an on state of a reception beam in a link. Here, the link may be the backhaul link, control link, and/or access link. Signaling of the on/off indication may be introduced due to dynamic scheduling of the base station. The base station may transmit the on/off indication to the intermediate node using a specific RCI format. The intermediate node may determine whether to relay communication between the base station and the terminal based on the on/off indication. When the on/off indication indicates 'on' (e.g., on state), the intermediate node may relay communication between the base station and the terminal. When the on/off indication indicates 'off' (e.g., off state), the intermediate node may not relay communication between the base station and the terminal.

Method 3-1: The intermediate node may receive an RCI format capable of deriving the on/off indication from the base station.

Both the NCR-Fwd function and the NCR-MT function may be considered in the DL operation and the UL operation of the intermediate node. The DL operation of the intermediate node may be an operation of receiving data in which DL data of the NCR-MT (e.g., DL data using the control ink) and DL data of the terminal (e.g., DL data forwarded using the backhaul link and the access link) are multiplexed. Similarly, the UL operation of the intermediate node may be an operation of transmitting data in which UL data of the NCR-MT (e.g., UL data using the control ink) and UL data of the terminal (e.g., UL data forwarded using the backhaul link and the access link) are multiplexed. Depending on the capability of the intermediate node, the UL data of the NCR-MT and the UL data of the terminal may be transmitted based on at least one of a time division multiplexing (TDM) scheme, a frequency division multiplexing (FDM) scheme, a spatial division multiplexing (SDM) scheme, or a combination thereof.

The DL operation and the UL operation may be distinguished, the on/off indication for the DL operation may be dynamically signaled, and the on/off indication for the UL operation may be dynamically signaled. The on/off indication for the DL operation may be referred to as 'DL on/off indication'. The on/off indication for the UL operation may be referred to as 'UL on/off indication'. Even when the 'off' indication (e.g., DL off indication and/or UL off indication) is received, the intermediate node may perform a transmission operation or a reception operation of data with the base station.

Method 3-2: The on/off indication signaled to the intermediate node may be classified into the DL on/off indication and the UL on/off indication, the on indication (e.g., DL on indication and/or UL on indication) may mean performing a transmission operation of a signal and/or channel, and the off indication (e.g., DL off indication and/or UL off indication) may mean not performing a transmission operation of a signal and/or channel.

In the present disclosure, the on/off indication may include at least one of the on indication, the off indication, the DL on indication, the DL off indication, the UL on indication, or the UL off indication. The base station may configure or indicate an SCS for interpreting the on/off indication to the intermediate node. The SCS for interpreting the on/off indication may be the SCS of the active BWP applied to the RCI format. The intermediate node may obtain the SCS for interpreting the on/off indication from the base station. The DL on/off indication may follow a DL SCS, and the DL SCS may be indicated to the intermediate node. The UL on/off indication may follow a UL SCS, and the UL SCS may be indicated to the intermediate node. In an FDD system, the DL on/off indication and the UL on/off indication may be preferably distinguished from each other.

According to a proposed method, in a procedure for measuring a DL signal and/or channel in the intermediate node, a measurement value may be distinguished according to the on/off indication received from the base station. According to technical specifications, a measurement time (e.g., slot) may be classified into two types. For example, the measurement time may be classified into a measurement time 1 and a measurement time 2. The base station may indicate or configured the measurement time 1 and/or the measurement time 2 to the intermediate node (or terminal). A measurement assumption for the measurement time 1 at the intermediate node (or terminal) may be different from a measurement assumption for the measurement time 2 at the intermediate node (or terminal). The measurement assumption may be assumption on a strength of a signal and/or a strength of an interference transmitted by the base station. Therefore, a signal to interference plus noise ratio (SINR) expected by the intermediate node at the measurement time 1 may be different from an SINR expected by the intermediate node at the measurement time 2. The base station may transmit classification information for the above-described measurement times through RRC signaling.

The intermediate node may receive an RCI format (or DCI format) from the base station, and derive the on/off indication at a specific time based on information included in the RCI format (or DCI format). According to Method 3-2, the on/off indication may indicate whether the intermediate node performs a signal and/or channel transmission operation.

4. RCI Format Reception Method

The intermediate node may detect an RCI format in a specific search space set. The RCI format may include at least one of TDD pattern information, TDD UL-DL switching information, on/off indication (e.g., on/off information), power control information, beam information, or combinations thereof. The beam information may indicate a beam of the intermediate node, which is used to relay communication between the base station and the terminal. The RCI format may include default information for operations of the intermediate node. The intermediate node may feedback hybrid automatic repeat request (HARQ)-acknowledgement (ACK) (or information corresponding to HARQ-ACK) for the RCI format to the base station. The RCI format may schedule data to be decoded by the intermediate node. Alternatively, the RCI format may not schedule data.

A processing time for reception and decoding of the RCI format at the intermediate node may be required. A processing time (e.g., processing time 1 and processing time 2) according to the capability of the intermediate node may be applied.

Figure 12:
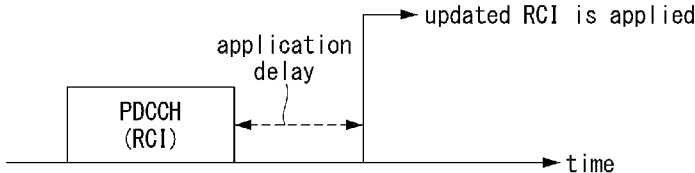
FIG. 12 is a conceptual diagram illustrating a first exemplary embodiment of a method for processing an RCI format in an intermediate node.

FIG. 12 is a conceptual diagram illustrating a first exemplary embodiment of a method for processing an RCI format in an intermediate node.

Referring to FIG. 12, the intermediate node may reflect information on the RCI format after a predetermined time (e.g., application delay) from a time of receiving the RCI format.

Method 4-1: The delay time (e.g., the application delay time of the RCI format) may be represented as a time from the last symbol of a control resource set (CORESET) in which the RCI format is received.

The base station may transmit the RCI format periodically. The intermediate node may periodically receive the RCI format. The intermediate node may derive a transmission operation and/or a reception operation based on information of the RCI format. Accordingly, a time when one RCI format is applied and a time when one RCI format is not applied may be distinguished from each other. The intermediate node may not reflect the information derived from the RCI format before a predetermined delay time elapses.

Figure 13:
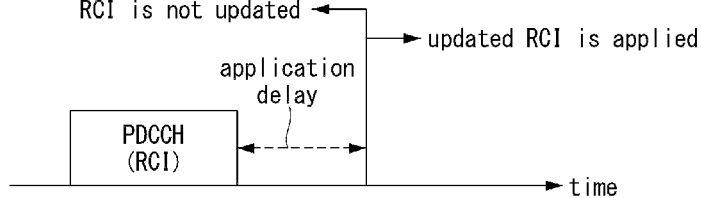
FIG. 13 is a conceptual diagram illustrating a second exemplary embodiment of a method for processing an RCI format in an intermediate node.

FIG. 13 is a conceptual diagram illustrating a second exemplary embodiment of a method for processing an RCI format in an intermediate node.

Referring to FIG. 13, the intermediate node may apply a time when the received RCI format is not applied.

Method 4-2: The intermediate node may not reflect information derived from the RCI format before a predetermined delay time elapses.

Meanwhile, the intermediate node may not detect an RCI format even though it expects to receive the RCI format. In this case, the intermediate node may derive a necessary operation from RCI (e.g., RCI format) configured through RRC signaling. Alternatively, the intermediate node may apply an operation derived from the most recently received RCI format.

The intermediate node may not derive HARQ-ACK for the RCI format. That is, the intermediate node may not feedback a HARQ-ACK for the RCI format to the base station. The above-described exemplary embodiment may be shown in FIGS. 12 and/or 13.

The intermediate node may feedback information such as a HARQ-ACK for the RCI format to the base station. In this case, the base station may perform a retransmission operation of the RCI format based on the HARQ-ACK. In the retransmission operation of the RCI format, the base station may retransmit the RCI format to the intermediate node at an early time in consideration of a round trip time (RTT). According to a proposed method, the base station may not retransmit the RCI format. The base station may indicate a transmission timing of the HARQ-ACK for the RCI format to the intermediate node regardless of a processing time of the intermediate node. The intermediate node may obtain information on the transmission timing of the HARQ-ACK for the RCI format from the base station, and may transmit the HARQ-ACK for the RCI format at the transmission timing.

The intermediate node may perform a decoding operation on the RCI format and generate the HARQ-ACK or ACK based on a result of the decoding operation. The decoding operation for the RCI format may be a blind decoding operation. Since the intermediate node searches for the RCI format by using a scrambling identifier, it may determine the ACK for the RCI format.

Method 4-3: The intermediate node may generate ACK based on a result of the decoding operation on the RCI format. Information derived from the RCI format may be reflected after a predetermined delay time.

Figure 14:
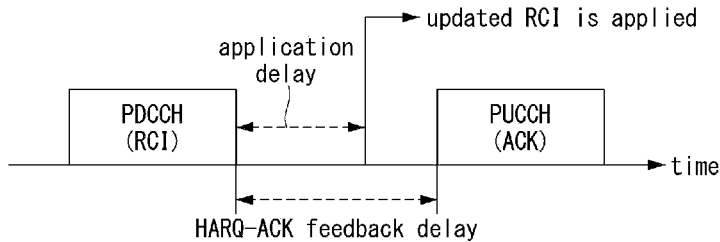
FIG. 14 is a conceptual diagram illustrating a third exemplary embodiment of a method for processing an RCI format in an intermediate node.

FIG. 14 is a conceptual diagram illustrating a third exemplary embodiment of a method for processing an RCI format in an intermediate node.

Referring to FIG. 14, the intermediate node may receive an RCI format from the base station, and may derive a timing of a PUCCH (e.g., HARQ-ACK feedback delay) from a reception time point of the RCI format (e.g., the last symbol in which the RCI format is received). In addition, the intermediate node may derive a delay time (e.g., application delay) required to apply the information of the RCI format. The information of the RCI format may be applied to a beam. The intermediate node may feedback a HARQ-ACK for the RCI format to the base station after the application delay for the RCI format.

When the ACK (e.g., HARQ-ACK) for the RCI format is not received from the intermediate node, the base station may determine that the RCI format has not been decoded at the intermediate node. That is, the base station may determine that a DTX for the RCI format has occurred in the intermediate node. If the intermediate node does not accurately reflect the RCI format, terminals connected to the base station through the intermediate node may not properly perform transmission and/or reception operations. The base station may find a cause of the above problem from the intermediate node. Therefore, the base station may control each terminal not to perform an unnecessary retransmission operation.

The intermediate node may derive information on one or more slot patterns using RCI. Information on one slot may be derived from two or more RCIs. The intermediate node may assume that information derived from two or more RCIs always coincide. Alternatively, when information derived from two or more RCIs are different, the intermediate node may use the most recently received RCI among the two or more RCIs.

Method 4-4: The intermediate node may derive information on one slot pattern from two or more RCIs, and may assume that the information on one slot pattern always coincides.

Method 4-5: The intermediate node may derive information on one slot pattern from two or more RCIs, and may apply information derived from the most recently received RCI among two or more RCIs.

Beam information and/or a TDD pattern (e.g., TDD UL-DL pattern) may be derived from RCI. Even when the intermediate node does not receive RCI, a method of interpreting beam information and/or a TDD pattern may be defined. For example, when RCI is not received, the intermediate node may apply a default beam and may apply a common pattern as the TDD pattern.

The on/off indication may be derived from the RCI. If the intermediate node cannot derive an on/off indication from the RCI (e.g., when the intermediate node does not receive the RCI), the intermediate node may assume one of the on indication and the off indication. For example, the intermediate node may assume that the on indication is configured, and may transmit a signal and/or channel by using the default beam. Alternatively, the intermediate node may assume that the off indication is configured, and may not transmit a signal and/or channel regardless of a beam.

A plurality of RCIs may be received in the same slot (or the same time period). In this case, the intermediate node may determine that the plurality of RCIs include the same information element(s) (e.g., on/off indication, beam information, and/or the like).

5. Power Control and Amplification Gain

A case when the intermediate node forwards a DL signal/channel of the base station to the terminal (i.e., DL forwarding), a case when the intermediate node forwards a UL signal/channel of the terminal to the base station (i.e., UL forwarding), and a case when the intermediate node transmits its own UL signal/channel to the base station (i.e., UL transmission) may be considered. In the present disclosure, a DL signal/channel may mean a DL signal and/or a DL channel, and a UL signal/channel may mean a UL signal and/or a UL channel.

The size of a power applied by the intermediate node may be determined according to indication of the base station. The power (e.g., transmission power) of the intermediate node may be determined based on a closed-loop control scheme and/or an open-loop control scheme. The base station may configure open loop control parameter set(s) to the intermediate node using RRC signaling. The intermediate node may obtain the open loop control parameter set(s) from the base station. The base station may transmit RCI or DCI including a power control command to the intermediate node. The intermediate node may obtain the power control command from the base station.

Based on technical specifications, the size of the power of the intermediate node may be indicated by the base station. The base station may indicate the size of the amplification gain to the intermediate node. The intermediate node may obtain the size of the amplification gain from the base station. A size of a received signal for a UL signal/channel 1 of one terminal may be different from a size of received signals for UL signal/channel 2 of a plurality of terminals.

Figure 15:
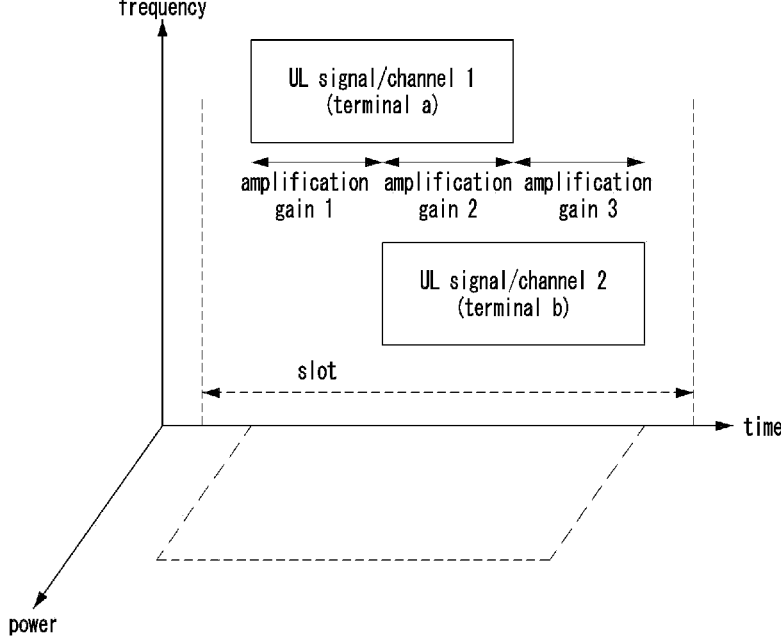
FIG. 15 is a conceptual diagram illustrating a first exemplary embodiment of a transmission power of an intermediate node.

FIG. 15 is a conceptual diagram illustrating a first exemplary embodiment of a transmission power of an intermediate node.

Referring to FIG. 15, a resource allocated for a terminal a and a resource allocated for a terminal b may overlap (e.g., partially overlap) in the time domain. Each of the terminal a and the terminal b may transmit a UL signal/channel using the allocated resource. The intermediate node may receive the UL signal/channel of each of the terminal a and the terminal b, and may transmit the corresponding UL signal/channel to the base station. That is, the intermediate node may perform a UL forwarding procedure.

The base station may indicate or configure a predetermined transmission power to the intermediate node. In the UL forwarding procedure, the intermediate node may use the predetermined transmission power indicated by the base station. An amplification gain 1 used when a UL signal/channel 1 of the terminal a is transmitted, an amplification gain 2 used when the UL signal/channel 1 of the terminal a and a UL signal/channel 2 of the terminal b are transmitted, and an amplification gain 3 used when the UL signal/channel of the terminal b 2 is transmitted may be different.

In this case, in a period of the UL channel, the transmission power of the intermediate node may be constant, and a reception power of the base station may vary. The above-described problem may also occur in a DL forwarding procedure. That is, in the DL forwarding procedure, the UL signal/channel 1 may be interpreted as a DL signal/channel 1, and the UL signal/channel 2 may be interpreted as a DL signal/channel 2.

Figure 16:
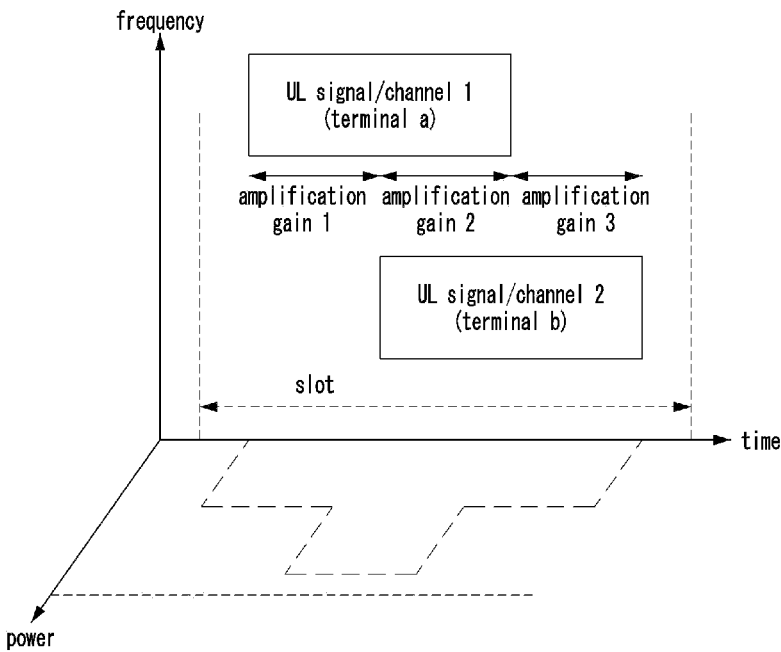
FIG. 16 is a conceptual diagram illustrating a second exemplary embodiment of a transmission power of an intermediate node.

FIG. 16 is a conceptual diagram illustrating a second exemplary embodiment of a transmission power of an intermediate node.

Referring to FIG. 16, a resource allocated for a terminal a and a resource allocated for a terminal b may overlap (e.g., partially overlap) in the time domain. Each of the terminal a and the terminal b may transmit a UL signal/channel using the allocated resource. The intermediate node may receive the UL signal/channel of each of the terminal a and the terminal b, and may transmit the corresponding UL signal/channel to the base station. That is, the intermediate node may perform a UL forwarding procedure.

The base station may indicate or configure a predetermined amplification gain to the intermediate node. In the UL forwarding procedure, the intermediate node may use the predetermined amplification gain indicated by the base station. In this case, in a period of the UL channel, a reception power of the base station may be constant, and a transmission power of the intermediate node may vary. The transmission power $P_R$ indicated by the base station to the intermediate node may be interpreted as the maximum transmission power of the UL signal/channel, and the amplification gain may be derived based on the above-described interpretation. In a DL forwarding procedure, the UL signal/channel 1 may be interpreted as a DL signal/channel 1, and the UL signal/channel 2 may be interpreted as a DL signal/channel 2.

Method 5-1: The intermediate node may derive an amplification gain based on indication of the base station, and may forward a signal and/or channel by constantly applying the derived amplification gain.

For a signal y to be forwarded by the intermediate node and a signal x generated by the intermediate node, the intermediate node may calculate amplification gains ($\alpha$, $\alpha_1$, $\alpha_2$) before performing amplification. The intermediate node may maintain the amplification gains for a predetermined time (e.g., slot(s)).

According to the proposed method, a time during which the intermediate node maintains the amplification gain may be derived, and the amplification gain may be changed after the derived time elapses. Considering one scheduling (e.g., the scheduling shown in FIG. 15 or 16), all symbols allocated to the terminal a and the terminal b may be considered as one time unit. The intermediate node may maintain the amplification gain the same during the above-mentioned time.

Figure 17:
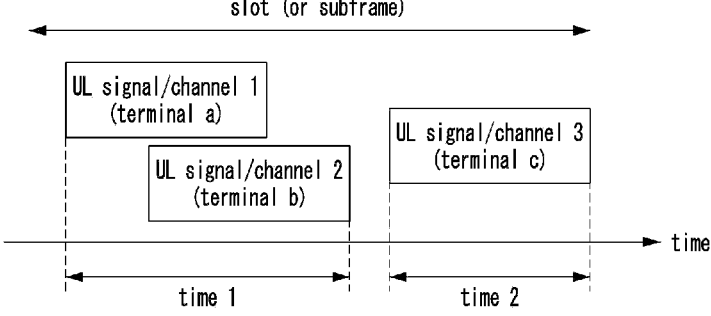
FIG. 17 is a conceptual diagram illustrating a first exemplary embodiment of a method of deriving a time unit during which constant amplification gain is applied.

FIG. 17 is a conceptual diagram illustrating a first exemplary embodiment of a method of deriving a time unit during which constant amplification gain is applied.

Referring to FIG. 17, a resource allocated for a terminal a and a resource allocated for a terminal b may overlap (e.g., partially overlap) in the time domain. The resource allocated for each of the terminal a and the terminal b may not overlap with a resource allocated for a terminal c in the time domain. When consecutive symbols are scheduled, the intermediate node may regard the consecutive symbols as one time unit and maintain the same amplification gain within one time unit. In the exemplary embodiment of FIG. 17, the intermediate node may derive two time units (e.g., time1, time2). During the time 1, the amplification gain of the intermediate node may be maintained to be the same, and during the time 2, the amplification gain of the intermediate node may be maintained to be the same. The amplification gain of the intermediate node during the time 1 may be different from the amplification gain of the intermediate node during the time 2. In a DL forwarding procedure, the UL signal/channel 1 may be interpreted as a DL signal/channel 1, the UL signal/channel 2 may be interpreted as a DL signal/channel 2, and the UL signal/channel 3 may be interpreted as a DL signal/channel 3.

Method 5-2: In the case of forwarding consecutively-scheduled signals, the intermediate node may not change the amplification gain. In the case of forwarding discontinuously-scheduled signals, the intermediate node may apply a new amplification gain.

A time unit scheduled by the base station to the terminal may be a mini-slot. In this case, a transmission power and/or a transmission timing may be changed at a slot boundary. When Method 5-2 is applied, a time unit derived by the intermediate node may be smaller than a slot (or subframe).

Meanwhile, for power control for UL transmission, the intermediate node may reuse the power control for UL forwarding. The intermediate node may apply an open loop control command for UL transmission to a set of closed loop control parameters for UL forwarding.

6. Power Headroom

The intermediate node may report a power headroom to the base station. A power headroom report of the intermediate node in the DL forwarding procedure, a power headroom report of the intermediate node in the UL forwarding procedure, and a power headroom report of the intermediate node in a UL transmission procedure may be regarded as independent power headroom reports.

When the intermediate node is implemented as in the exemplary embodiment shown in FIGS. 5, 6, 7, and/or 10, the UL forwarding procedure and the UL transmission procedure may be performed simultaneously. Alternatively, only one of the UL forwarding procedure and the UL transmission procedure may be performed. When the UL forwarding procedure and the UL transmission procedure are performed simultaneously, the intermediate may need to be able to perform power headroom reporting.

According to technical specifications, a value included in the power headroom report may be a difference between the maximum power of the terminal and the transmission power of the terminal. Here, the transmission power may be a transmission power of a scheduled PUSCH or a transmission power of an unscheduled PUSCH (e.g., a reference PUSCH defined in technical specifications). The power headroom reports for the UL forwarding procedure and the UL transmission procedure in the intermediate node may be defined differently.

According to a proposed method, when the UL forwarding procedure and the UL transmission procedure are simultaneously performed in the FDM scheme, the intermediate node may use a transmission power of an output signal of the amplifier (e.g., UL amplifier) to derive a power headroom. In this case, the intermediate node may not need to calculate the power headroom in consideration of scheduling. The power headroom may be derived from the transmission power $P_R$ itself of the intermediate node. For example, the power headroom of the intermediate node may be derived based on (Pmax-$P_R$). Pmax may be the maximum power of the intermediate node. $P_R$ may be the transmission power of the intermediate node.

Method 6-1: The intermediate node may derive the power headroom report based on its transmission power.

The intermediate node may perform only the UL forwarding procedure. According to technical specifications, the intermediate node may derive a transmission power in consideration of an allocated bandwidth, and generate a power headroom report based on the derived transmission power. Since the intermediate node does not separately perform a decoding operation, the allocated bandwidth may not be well defined. That is, the allocated bandwidth may be a bandwidth of a carrier of the base station (or a bandwidth of a serving cell configured to the intermediate node).

According to a proposed method, when deriving the power headroom report for the UL forwarding procedure, the intermediate node may calculate a separate power headroom value. According to technical specifications, the intermediate node may calculate a power headroom for each one PUSCH occasion (or PUCCH occasion or sounding reference signal (SRS) resource). Therefore, the power of the intermediate node may have a single value. Considering a case where the intermediate node forwards signals of a plurality of terminals, the size of power may be changed.

Method 6-2: The intermediate node may derive a power headroom value in the time unit during which the amplification gain is maintained. The derived power headroom value may be an average value of power.

If there are a plurality of time units for maintaining the amplification gain in the slot, the power headroom value may be derived using the first time unit (or the last time unit).

When the intermediate node does not derive the above-mentioned time unit or when the intermediate node does not maintain the amplification gain, the time unit for deriving the power headroom value may be fixed to one value.

Method 6-3: The power headroom value may be derived using an average value of allocated power during a predetermined slot.

According to technical specifications, the power headroom report may be derived based on actual scheduling or virtual scheduling. In a PUSCH transmission procedure based on actual scheduling, the power headroom report may be derived from the amount of power allocated to a PUSCH. Assuming a virtually scheduled reference PUSCH transmission, the power headroom report may be derived from the amount of power allocated to a reference PUSCH. A slot (or subframe) from which the power headroom value is derived may be determined in technical specifications. In order for the intermediate node to report the power headroom value to the base station in the signal forwarding procedure, it may be preferable that the slot from which the power headroom value is derived is indicated or configured by the base station.

Method 6-4: The intermediate node may determine a slot by applying a predetermined slot offset, and may derive a power headroom value from the determined slot.

The base station may indicate to the intermediate node a slot in which the intermediate node performs power headroom reporting. An event that triggers the power headroom reporting may be determined based on a timer (e.g., a periodic timer, prohibit timer, etc.). According to Method 6-4, the intermediate node may determine the slot from which the power headroom value is derived by applying the offset from the slot (or subframe) in which the timer expires. Here, the base station may configure the offset to the intermediate node through RRC signaling.

The intermediate node may perform the UL transmission procedure, the UL forwarding procedure, and/or the DL forwarding procedure. In this case, the intermediate node may perform power control for the DL forwarding procedure and derive a power headroom value for the DL forwarding procedure. The intermediate node may apply a power control method and a method for deriving a power headroom value for the UL forwarding procedure.

7. Beam Information Interpretation Method

The intermediate node may receive beam information (e.g., beam indication information) from the base station. The intermediate node may derive the beam information based on side control information (SCI). The beam information may be included in RCI. Each of a beam generated by the intermediate node and a beam applied by the intermediate node may be a DL Rx beam, a DL Tx beam, a UL Rx beam, and/or a UL Tx beam.

In downlink communication, the intermediate node may receive a signal from the base station, and may apply an Rx beam (e.g., Rx beam of the control link or Rx beam of the backhaul link) in the reception operation of the signal of the base station. In a procedure for forwarding the signal from the base station to the terminal(s), the intermediate node may apply a Tx beam (e.g., Tx beam of the access link). The intermediate node may receive a signal from the terminal(s) and may apply an Rx beam (e.g., Rx beam of the access link) in the reception operation of the signal of the terminal(s). In a procedure for forwarding the signal of the terminal(s) to the base station, the intermediate node may apply a Tx beam (e.g., Tx beam of the backhaul link).

In order to distinguish the above-mentioned beams, the beam of the intermediate node may be referred to as a DL Tx beam, a DL Rx beam, a UL Tx beam, or a UL Rx beam. The beam of the intermediate node may be further classified. For example, the Rx beam of the control link and the Rx beam of the backhaul link may be separately indicated. Alternatively, in the same beam sets, the Rx beam of the control link or the Rx beam of the backhaul link may be selected identically or differently. The beam of the base station may be referred to as a Tx beam or an Rx beam, and the beam of the terminal may be referred to as a Tx beam or an Rx beam.

The base station may configure an index of an Rx beam(s) (e.g., transmission configuration indication (TCI) states) to the terminal through RRC signaling. The base station may indicate an Rx beam to be applied by the terminal by transmitting DCI including an index (e.g., TCI state index).

The base station may indicate or configure a DL Rx beam of the intermediate node to the intermediate node. That is, the DL Tx beam of the intermediate node may be separately indicated. Even when the beams between the base station and the intermediate node (e.g., a DL/UL beam pair of the control link or the backhaul link) are maintained, if only the DL Tx beam of the intermediate node (e.g., the Tx beam of the access link) is changed, the beams between the base station and the terminal (e.g., a DL/UL beam pair of the terminal), which are interpreted by the terminal, may be changed. Therefore, in the beam management procedure between the terminal and the base station, the DL Tx beam of the intermediate node may be changed.

It may be preferable for the base station to separately control the DL Rx beam and the DL Tx beam of the intermediate node. That is, the DL Rx beam and DL Tx beam of the intermediate node may be independently controlled by the base station. In this case, a specific format of a MAC control element (CE) may be used to control the DL Rx beam of the intermediate node. The specific format of the MAC CE may be a format of MAC CE for indicating a TCI state to the terminal or a format of MAC CE for changing the TCI state of the terminal. Alternatively, a separate MAC CE may be used to change the DL Tx beam of the intermediate node.

The base station may indicate the DL Rx beam and DL Tx beam of the intermediate node to the intermediate node. A specific association relationship between the DL Rx beam and the DL Tx beam may be established. The specific association relationship may be indicated to the intermediate node. According to the information indicated by the base station to the intermediate node, both the DL Rx beam (e.g., the Rx beam of the control link or the Rx beam of the backhaul link) and the DL Tx beam (e.g., the Tx beam of the access link) may be derived.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of an intermediate node for relaying communication between a base station and a terminal, comprising:

receiving, from the base station, first control information including on/off indication and a transmission configuration indication (TCI) state to be applied by the intermediate node, which is used to relay the communication between the base station and the terminal;

determining whether to relay the communication between the base station and the terminal according to the on/off indication;

relaying the communication between the base station and the terminal when the on/off indicates 'on'; and receiving second control information from the base station, wherein the second control information is received after receiving the first control information, and when the first control information and the second control information are to be applied to a same time period, an information element of the second control information is selected to be applied to the same time period, and the information element is at least one of the on/off indication of the TCI state, wherein the relaying of the communication comprises:

transmitting a first signal received from the base station to the terminal;

transmitting a second signal received from the terminal to the base station;

transmitting a third signal generated by the intermediate node to the base station; and transmitting, to the base station, a fourth signal obtained by multiplexing a fifth signal generated by the intermediate node and a sixth signal received from the terminal.

2. The method according to claim 1, wherein the on/off indication is classified into a downlink (DL) on/off indication and an uplink (UL) on/off indication; when the DL on/off indication indicates 'DL on', the intermediate node performs DL communication for the terminal; and when the UL on/off indication indicates 'UL on', the intermediate node perform UL communication for the base station.

3. The method according to claim 1, wherein a TCI state applied to a DL reception beam and a TCI state applied to a DL transmission beam of the intermediate node are independently controlled by the base station.

4. The method according to claim 1, further comprising: transmitting hybrid automatic repeat request (HARQ)-acknowledgment (ACK) for the first control information to the base station.

5. The method according to claim 1, wherein a subcarrier spacing (SCS) of the intermediate node is greater than or equal to an SCS of the terminal.

6. The method according to claim 1, wherein the first control information is reflected at the intermediate node after an application delay required for applying the first control information elapses.

7. A method of a base station, comprising:

transmitting, to an intermediate node relaying communication between the base station and a terminal, first control information including on/off indication and a transmission configuration indication (TCD) state to be applied by the intermediate node, which is used to relay the communication between the base station and the terminal;

transmitting second control information to the intermediate node, wherein when the second control information is transmitted after transmitting the first control information, and when the first control information and the second control information are to be applied to a same time period an information element of the second control information is selected to be applied to the same time period, and the information element is at least one of the on/off indication of the TCI state; and performing communication with the terminal according to the on/off indication, wherein when the on/off indication indicates 'on', the communication between the base station and the terminal is relayed by the intermediate node, and wherein the communication between the base station and the terminal is relayed by the intermediate node that performs:

transmitting a first signal received from the base station to the terminal;

transmitting a second signal received from the terminal to the base station;

transmitting a third signal generated by the intermediate node to the base station; and transmitting, to the base station, a fourth signal obtained by multiplexing a fifth signal generated by the intermediate node and a sixth signal received from the terminal.

8. The method according to claim 7, wherein a TCI state applied to a downlink (DL) reception beam and a TCI state applied to a DL transmission beam of the intermediate node are independently controlled by the base station.

9. The method according to claim 7, further comprising: receiving hybrid automatic repeat request (HARQ)-acknowledgment (ACK) for the first control information from the terminal.

10. An intermediate node for relaying communication between a base station and a terminal, comprising a processor, wherein the processor causes the intermediate node to perform:

receiving, from the base station, first control information including on/off indication and a transmission configuration indication (TCI) state to be applied by the intermediate node, which is used to relay the communication between the base station and the terminal;

determining whether to relay the communication between the base station and the terminal according to the on/off indication;

relaying the communication between the base station and the terminal when the on/off indicates 'on'; and receiving second control information from the base station, wherein the second control information is received after receiving the first control information, and when the first control information and the second control information are to be applied to a same time period, an information element of the second control information is selected to be applied to the same time period and the information element is at least one of the on/off indication or the TCI state, wherein the relaying of the communication comprises:

transmitting a first signal received from the base station to the terminal;

transmitting a second signal received from the terminal to the base station;

transmitting a third signal generated by the intermediate node to the base station; and transmitting, to the base station, a fourth signal obtained by multiplexing a fifth signal generated by the intermediate node and a sixth signal received from the terminal.

11. The intermediate node according to claim 10, wherein the on/off indication is classified into a downlink (DL) on/off indication and an uplink (UL) on/off indication; when the DL on/off indication indicates 'DL on', the intermediate node performs DL communication for the terminal; and when the UL on/off indication indicates 'UL on', the intermediate node perform UL communication for the base station; and when the UL on/off indication indicates 'UL off'.

12. The intermediate node according to claim 10, wherein the processor causes the intermediate node to perform: transmitting hybrid automatic repeat request (HARQ)-acknowledgment (ACK) for the first control information to the base station.

* * * * *